Oct. 22, 1957   J. H. BOICEY ET AL   2,810,668
APPARATUS FOR LAMINATING GLASS SHEETS
Filed Oct. 27, 1954
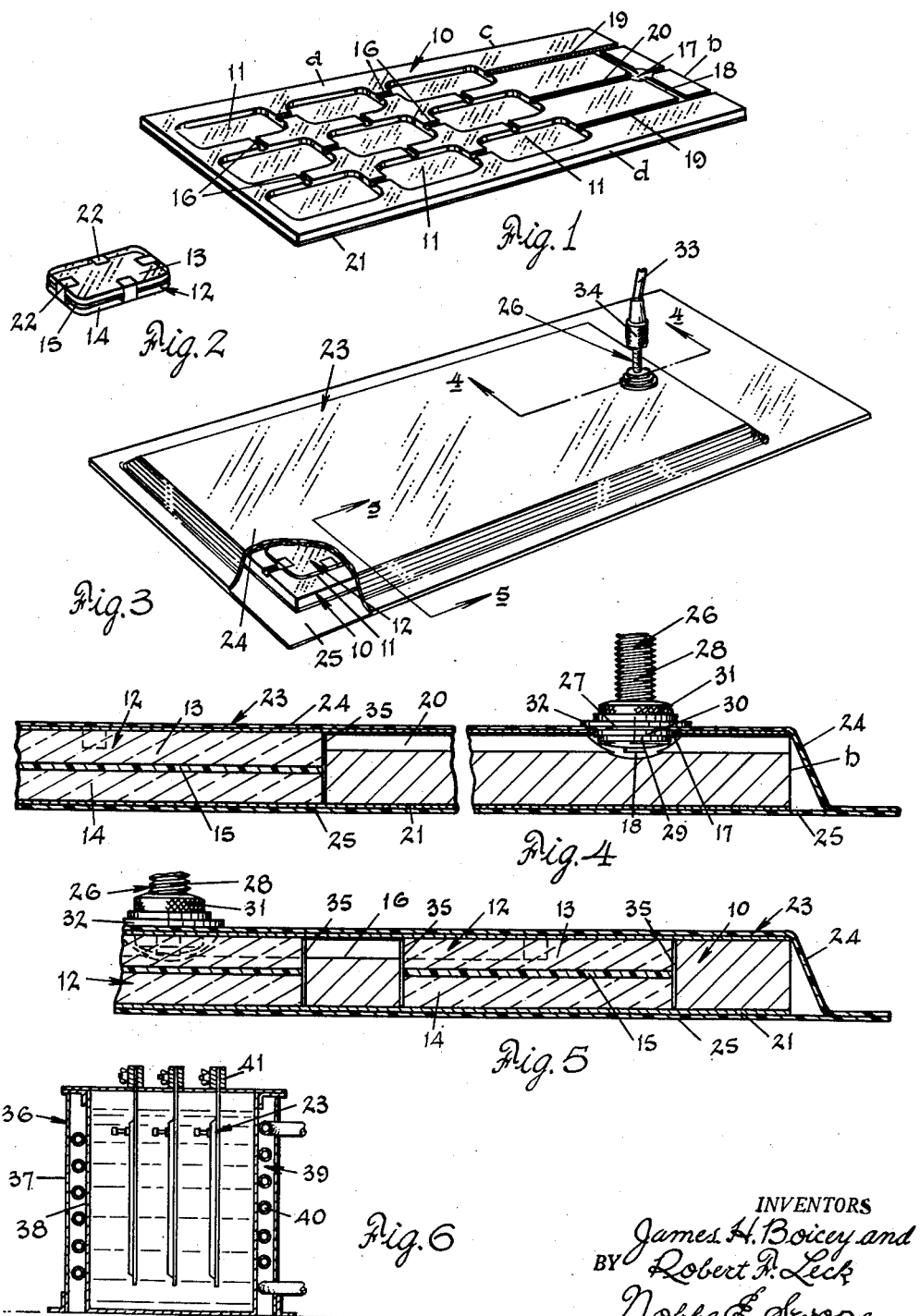
INVENTORS
James H. Boicey and
BY Robert F. Leck
Nobbe & Swope
ATTORNEYS

United States Patent Office 2,810,668
Patented Oct. 22, 1957

2,810,668

APPARATUS FOR LAMINATING GLASS SHEETS

James H. Boicey and Robert F. Leck, Toledo, Ohio, assignors to Libbey-Owens-Ford Glass Company, Toledo, Ohio, a corporation of Ohio Application October 27, 1954, Serial No. 465,031

5 Claims. (Cl. 154—2.7)

This invention relates broadly to improvements in the laminating of sheets or plates of glass, and more particularly to an improved method and apparatus for laminating a plurality of units at the same time.

The commonly used method of producing laminated safety glass comprises first assembling two sheets of glass with a thermoplastic interlayer therebetween to form a glass-plastic sandwich, prepressing the sandwich by passing it through a series of rollers, and then effecting final lamination by placing the prepressed sandwich in an autoclave wherein it is subjected to heat and pressure. The prepressing operation is an important step in the method because it is necessary that the residual air remaining between the assembled sheets be removed so that it will not appear as bubbles in the finished laminated product. The prepressing also seals the edges of the sandwich so that air will not re-enter during subsequent handling operations prior to autoclaving, and further prevents the fluid used in the autoclave from entering the edges of the sandwich and discoloring the plastic interlayer.

Another method of laminating glass-plastic sandwiches by which the separate step of prepressing is eliminated, comprises placing the sandwich to be laminated in a flexible bag, evacuating the bag to remove air from between the several sheets comprising the sandwich, and then sealing the bag and placing it in an autoclave wherein the final laminating of the sandwich takes place.

However, when a large number of relatively small units are to be laminated the foregoing methods are not always entirely satisfactory. Thus, the use of prepress rolls requires special handling of the units to be laminated since the rolls ordinarily are designed to handle relatively large units, while in the so-called bag method, as it is commonly used, the cost of laminating becomes excessive in proportion to the size of the unit since an individual bag provided with a vacuum connection must be provided for each unit to be laminated.

It is therefore an important object of the present invention to provide an improved method and means for laminating glass-plastic sandwiches, and which is of particular utility in laminating relatively small units.

Another object of the invention is the provision of novel apparatus by which a plurality of sandwiches can be laminated simultaneously.

A further object of the invention is the provision of apparatus of the vacuum bag type having novel means for containing a plurality of sandwiches to be laminated.

Other objects and advantages of the invention will become more apparent during the course of the following description when taken in connection with the accompanying drawings.

In the drawings, wherein like numerals are employed to designate like parts throughout the same:

Fig. 1 is a perspective view of a frame constructed in accordance with the invention and adapted to contain a plurality of glass-plastic sandwiches to be laminated;

Fig. 2 is a perspective view of one of the sandwiches prior to being placed within the frame of Fig. 1;

Fig. 3 is a perspective view of the frame having the sandwiches contained therein and enclosed in a flexible air-tight vacuum bag;

Fig. 4 is a detail longitudinal section taken along the line 4—4 of Fig. 3 and showing means whereby the bag may be evacuated;

Fig. 5 is a detail transverse section taken along the line 5—5 of Fig. 3; and

Fig. 6 is a cross-sectional view of a tank containing fluid in which the vacuum bag assemblies are placed for final lamination.

Briefly stated, according to the present invention a plurality of glass-plastic sandwiches to be laminated are arranged side-by-side in a frame which is then inserted in a flexible air-tight envelope which is sealed, evacuated of air, and then submerged in a heated fluid to simultaneously laminate the sandwiches.

With reference now to the drawings and particularly to Fig. 1, there is shown a rectangular frame 10 which may be formed of a suitable synthetic heat-resisting material and which is provided with a plurality of rectangular openings or recesses 11 disposed in longitudinal and transverse rows. Each row consists of three recesses and each of the recesses is of such a size and shape as to loosely contain one of the glass-plastic sandwiches 12 (Fig. 2) to be laminated. The unit 12 comprises two sheets of glass 13 and 14 having a thermoplastic interlayer 15 therebetween. The shape and size of the recesses 11 will, of course, be determined by the shape and size of the article to be pressed. Likewise, the article may consist of two or more sheets of glass and two or more layers of plastic material.

The thickness of the frame 10 is substantially equal to that of the sandwich 12, and each of the recesses 11 is connected to its adjacent recesses 11 by means of a plurality of relatively narrow passageways 16 cut into the upper surface a of the frame 10. At the end b of the frame but spaced inwardly from the end edge thereof, is a concave depression 17 also formed in the upper surface a which, as later described, is the point at which the vacuum is applied.

A transverse channel 18 provided in the upper surface a of the frame inwardly of and parallel with the edge b passes through the depression 17 and has its ends terminating in similar longitudinal channels 19 spaced inwardly from and parallel with the side edges c and d of the furnace. Each of the channels 19 has its inner end terminating in a recess 11 and its outer end open to the edge b of the frame. A third channel 20 is provided in the surface a parallel to and equally spaced between the aforementioned channels 19 and terminates at its inner end in a recess 11 and at its outer end at the frame edge b. This channel 20 passes through the depression 17 and provides therefore a direct communication between the recesses 11 and the depression. To support the sandwiches 12 within the frame and keep them from falling through the recesses 11, a sheet of somewhat flexible heat-resistant material 21 is preferably secured to the bottom surface of the frame.

When assembling the sandwich 12 prior to its being placed within the frame, the surface of the several laminations making up the sandwich are carefully cleaned and assembled in face-to-face contacting relationship with one another. Strips of tape or the like 22 are applied at the edges of the sandwich to hold the several layers in proper relationship with one another and the sandwich then placed in one of the recesses 11 provided in the frame.

After the sandwiches have been placed within the frame, the frame is inserted into a flexible bag or envelope 23 preferably formed of cellophane or similar material and which comprises an upper sheet 24 and a lower sheet 25 suitably joined or sealed together at their marginal edges in such a manner as to leave one edge open. After the frame with the sandwiches thereon has been placed within the bag 23, the edge of the bag that had been left open is sealed such as by running a hot iron or similar means along the edges of the cellophane sheets to form an airtight enclosure.

As a means of withdrawing air from the bag, the envelope has a vacuum connection 26 formed therein. The connection 26 comprises a hollow, externally threaded stem 28 inserted through a hole 27 in the upper sheet and having a seat 29 adjacent the under surface of the sheet 24. A rubber washer 30 of a relatively larger diameter than the hole 27 encircles the stem 28 and spaces the seat 29 from the upper sheet. The threaded portion of the stem is provided with a nut 31 and rubber washer 32 assembly carried outwardly of the sheet 24 which, when screwed downwardly on the stem, grips the sheet 24 between the washers 30 and 32 to provide a relatively airtight joint between the vacuum connection 26 and the envelope 23.

When the frame 10 is properly oriented within the envelope, the seat 29 is received within the concave depression 17 provided in the frame 10. To evacuate the envelope, a hose 33 having an internally threaded coupling 34 on one end thereof is threaded over the stem 28 of the vacuum connection. The other end of the hose (not shown) communicates with a suitable vacuum pump or the like.

With the frame 10 encased within the flexible envelope 23 and the edges thereof sealed together, the bag assembly is evacuated so as to remove residual air that may have become entrapped between the several layers comprising the individual sandwiches and which, if left therebetween, would show up as objectionable bubbles in the resultant laminated product. As seen in Figs. 4 and 5, each of the recesses 11 within which the sandwiches are contained is slightly larger than the sandwich so that a relatively narrow space 35 exists between the edges of the sandwich and the walls of the recess. When the vacuum is applied, the air between the several layers comprising the sandwich is drawn outwardly into the space 35. At the same time, the atmosphere applies pressure evenly to the upper and lower surfaces of the bag which in turn transmits this pressure to the top and bottom surfaces of the sandwiches 12. Since each of the recesses 11 communicates with adjacent recesses through the passageways 16, the vacuum acts on all recesses simultaneously and draws the air therefrom through the channels 18, 19 and 20 into the depression 17 and thence through the vacuum connection 26. At the same time, the air within the envelope 23 around the edges of the frame 10 is drawn into the depression 17 through the outer ends of the channels 19 and 20 which terminate at the frame edge b.

Due to the minute corrugations or ridge-like formations on the surfaces of the thermoplastic interlayer 15 it is preferred that the vacuum be continued for a sufficient length of time to completely remove the air from between these ridges. For example, it has been found that evacuating the bag for a period of 20 minutes at approximately 28½ or 29 inches of mercury column vacuum is sufficient for this purpose. It will be understood, of course, that periods of evacuation in excess of 20 minutes will not in any manner have an adverse effect on the sandwiches but rather will provide assurance of more complete air removal from between the several layers comprising each sandwich.

With the vacuum still being applied to the envelope 23, the bag assembly is placed within a tank 36 (Fig. 6) wherein final lamination takes place. The tank 36, for example, may comprise an outer shell 37 and a spaced inner shell 38 which contains a suitable liquid such as oil. The space 39 between the two shells contains a heating coil 40 through which steam may be circulated. Before the bag assembly is inserted within the tank, the temperature of the oil or other liquid is raised to approximately 250° F. The bag is then clamped to a support 41 and, with the vacuum continued, immersed in the heated liquid for a sufficient length of time to soften the plastic interlayer. It has been found that approximately one minute is sufficient for this purpose after which the vacuum is disconnected.

It is important that the vacuum not be continued beyond the point at which the plastic interlayer 15 is softened, due to the atmospheric pressure pressing on the bag 23 and transmitted thereby to the glass sheets 12 and 13 which, with the pulling action of the vacuum, tends to force the plastic interlayer 15 outwardly beyond the edges of the glass sheets. This has the effect of thinning the interlayer at the edge portions of the sandwiches thereby allowing air to seep between the two glass sheets and producing imperfections in the final laminated product. Of course, if a temperature less than 250° F. is maintained within the tank the period during which the vacuum is applied while the bag assembly is within the tank may be increased so that the interlayer of each sandwich may become properly softened and bonded to the glass sheets. It has been found that at the expiration of approximately one minute at a temperature in the order of 250° F., the interlayer 15 of the sandwich 12 has become softened to the extent that atmospheric pressure is sufficient to effect a satisfactory bond between the glass sheets and the plastic interlayer. The vacuum is then discontinued and the bag left within the tank for approximately 20 minutes at a temperature in the order of 250° F. After this period of time has elapsed, the sandwiches 12 are laminated and may be removed from the bag.

It is to be understood that the form of the invention herewith shown and described is to be taken as a preferred embodiment of the same, and various changes may be resorted to without departing from the spirit of the invention or the scope of the subjoined claims.

We claim:

1. Laminating apparatus in which a plurality of glass-plastic sandwiches are simultaneously laminated, comprising a flexible air-tight envelope for receiving a plurality of sandwiches to be laminated therein and having a vacuum connection therewith, and a frame encased within said envelope and having a plurality of intercommunicating recesses therein for receiving said sandwiches, said frame having means therein for evacuating air from a plurality of recesses through said vacuum connection.

2. Laminating apparatus in which a plurality of glass-plastic sandwiches are simultaneously laminated, comprising a flexible air-tight envelope for receiving a plurality of sandwiches to be laminated therein and having a vacuum connection therewith, and a frame encased within said envelope and having a plurality of intercommunicating recesses therein for receiving said sandwiches, said frame having an opening therein adjacent the vacuum connection in the flexible bag, and means provided in said frame whereby air may be evacuated from the plurality of recesses therein through said opening adjacent the vacuum connection and then out the vacuum connection.

3. Laminating apparatus in which a plurality of glass-plastic sandwiches are simultaneously laminated, comprising an air-tight flexible envelope having a vacuum connection provided therein, and a heat resistant frame within and surrounded by said envelope, said frame having a plurality of recesses therein within which the sandwiches to be laminated are contained, passageways in a surface of said frame connecting adjacent recesses to one another, a depression in said frame adjacent the vacuum connection in the flexible envelope, and means within said frame communicating with said depression and said recesses whereby air may be withdrawn simultaneously from said recesses and through said vacuum connection.

4. A frame for containing a plurality of glass-plastic sandwiches to be simultaneously laminated and which is to be enclosed in an air-tight flexible bag which is subsequently exposed to heat, comprising a base member having a plurality of recesses extending completely therethrough in which the sandwiches are received, passageways in one surface of said frame extending between adjacent recesses, and a channel in said frame communicating with said recesses whereby air may be withdrawn simultaneously from said recesses.

5. A frame for containing a plurality of glass-plastic sandwiches to be laminated and which is to be enclosed in an air-tight flexible bag which is subsequently exposed to heat, comprising a base member having a plurality of recesses extending completely therethrough in which the sandwiches are received, a flexible sheet secured to a surface of said frame and extending over said recesses for supporting said sandwiches in said recesses, a depression in the opposite surface of said frame, passageways in the frame in said opposite surface thereof and communicating with adjacent recesses, and a plurality of channels in said opposite surface communicating with said recesses and said depression whereby air may be withdrawn simultaneously from said recesses.

References Cited in the file of this patent

UNITED STATES PATENTS

| | | |
|---|---|---|
| 1,887,550 | Fix et al. | Nov. 15, 1932 |
| 1,887,565 | Shirts | Nov. 15, 1932 |
| 2,054,864 | Owen | Sept. 22, 1936 |

FOREIGN PATENTS

| | | |
|---|---|---|
| 488,315 | Great Britain | July 5, 1938 |